United States Patent Office 2,785,195
Patented Mar. 12, 1957

2,785,195

N-(3-METHYLCYCLOPENTYL)-SULFAMIC ACID AND SALTS THEREOF

Karl M. Beck, Lake Bluff, and Arthur W. Weston, Waukegan Township, Lake County, Ill., assignors to Abbott Laboratories, North Chicago, Ill., a corporation of Illinois No Drawing. Application August 30, 1954,
Serial No. 453,152

5 Claims. (Cl. 260—500)

The new invention relates to sulfamic acid derivatives and their salts and more particularly to N-(3-methylcyclopentyl)-sulfamic acid and its salts.

The class of compounds included within the scope of this invention is represented by the formula

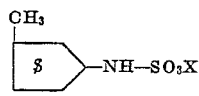

wherein X is selected from the group consisting of hydrogen and cationic salt forming groups.

It has been found that the compounds of this invention possess an intense sweetness many times that of sucrose and they are useful as sweetening agents, particularly in those instances where a non-caloric sweetening agent is desired. The sweetness of these compounds is the more remarkable because any change in the molecule (except for the X component) will result in complete loss of sweetness in the resulting compound or a substantial reduction in sweetness.

The cationic salt forming groups referred to herein include sodium, potassium, calcium and other non-toxic metallic ions and may also include organic bases such as amine bases. It is thought that the cationic salt forming group is subordinate to the N-(3-methylcyclopentyl)-sulfamic acid group in causing the sweet taste of the compound. Hence, the cationic salt forming group may be selected for any given purpose without seriously affecting the sweet taste of the compound.

The compounds may be made according to the directions given in the following examples.

Example I 1.90 grams of chlorosulfonic acid (0.0165 mol) in 30 cc. of chloroform is added dropwise to 5.5 grams (0.055 mol) of 3-methylcyclopentyl amine in 40 cc. of chloroform. The addition is made over a period of about ten minutes at 0° C. with stirring. The solvent is evaporated and 1.64 grams of sodium hydroxide in 35 cc. of water is added. The impurities are extracted with ether and the product is allowed to crystallize from the aqueous phase. After drying, the product is extracted with hot 12A alcohol, crystallized from the alcohol and then recrystallized to yield the pure product, sodium N-(3-methylcyclopentyl)-sulfamate. The white crystalline solid was found to have a melting point of 235-240° C. The analysis calculated for $C_6H_{12}NSO_3Na$ is N, 6.96%. The analysis as found is N, 6.91%.

Example II

The procedure related above is carried out in the same fashion using potassium hydroxide in place of the sodium hydroxide of Example I to produce potassium N-(3-methylcyclopentyl)-sulfamate.

Example III

The reaction was carried out in exactly the same manner as related in Example I except that calcium hydroxide was used in place of sodium hydroxide in Example I to produce calcium N-(3-methylcyclopentyl)-sulfamate.

We claim:
1. A compound of the formula

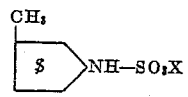

where X is selected from the group consisting of hydrogen and non-toxic metallic ions.
2. N - (3 - methylcyclopentyl) - sulfamic acid.
3. Sodium N - (3 - methylcyclopentyl) - sulfamate.
4. Calcium N - (3 - methylcyclopentyl) - sulfamate.
5. Potassium N - (3 - methylcyclopentyl) - sulfamate.

References Cited in the file of this patent
FOREIGN PATENTS

| | | |
|---|---|---|
| 662,800 | Great Britain | Dec. 12, 1951 |
| 669,200 | Great Britain | Mar. 26, 1952 |

OTHER REFERENCES

Audrieth et al.: J. Org. Chem. 9 pp. 89–91, 95–96 and 98–99 (1944).